(12) United States Patent
Jung

(10) Patent No.: US 6,243,819 B1
(45) Date of Patent: Jun. 5, 2001

(54) LID SWITCH IN PORTABLE COMPUTERS AND THE POWER MANAGEMENT SYSTEM USING THE SAME

(75) Inventor: Hee-Duck Jung, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/058,855

(22) Filed: Apr. 13, 1998

(30) Foreign Application Priority Data

Apr. 15, 1997 (KR) .................................................. 97-13727

(51) Int. Cl.⁷ ................................. G06F 1/26; G06F 1/32
(52) U.S. Cl. .......................... 713/320; 713/300; 713/310; 713/321; 713/322; 713/323; 713/324; 713/330; 713/340
(58) Field of Search ..................................... 713/300, 310, 713/320, 321, 322, 323, 324, 330, 340; 710/107

(56) References Cited

U.S. PATENT DOCUMENTS

| 4,901,261 | 2/1990 | Fuhs . |
| 5,021,983 | 6/1991 | Nguyen et al. . |
| 5,077,551 | 12/1991 | Saitou . |
| 5,175,672 | 12/1992 | Conner et al. . |
| 5,235,532 | 8/1993 | Sugino . |
| 5,303,171 | 4/1994 | Belt et al. . |
| 5,580,107 | * 12/1996 | Howell ................................. 292/95 |
| 5,630,142 | 5/1997 | Crump et al. . |
| 5,634,137 | 5/1997 | Merkin et al. . |
| 5,987,613 | * 11/1999 | Busch et al. ........................ 713/300 |
| 6,044,473 | * 3/2000 | Kim ................................... 713/320 |

* cited by examiner

Primary Examiner—Rupal Dharia
(74) Attorney, Agent, or Firm—Robert E. Bushnell, Esq.

(57) ABSTRACT

A portable computer supported by a power management system that responds to a closed state and an open state of a flat panel display. A closed position and an open position of a lid (housing the display) of the portable computer is detected by a switch mounted adjacent to a display latch device. When the display is moved to the closed position, a switch-on signal is supplied to the power management system which allows the computer system components to enter a suspend mode, consuming less power than while in a full-power on mode. This will turn off the power after saving the current memory and system information to disk. The display latch device includes a knob having a latch hook and a groove formed in a top portion of a main body selectively locking and releasing the latch hook. This invention provides a simple location of the switch and the arrangement may eliminate special function keys manually operated for turning off the computer or invoking a power management signal. Further, the present invention provides for a maximization of battery life. The portable computer can correspond to a notebook computer, laptop computer, or other compact or lightweight computer. The present invention can be used in conjunction with a portable word processor also.

20 Claims, 6 Drawing Sheets

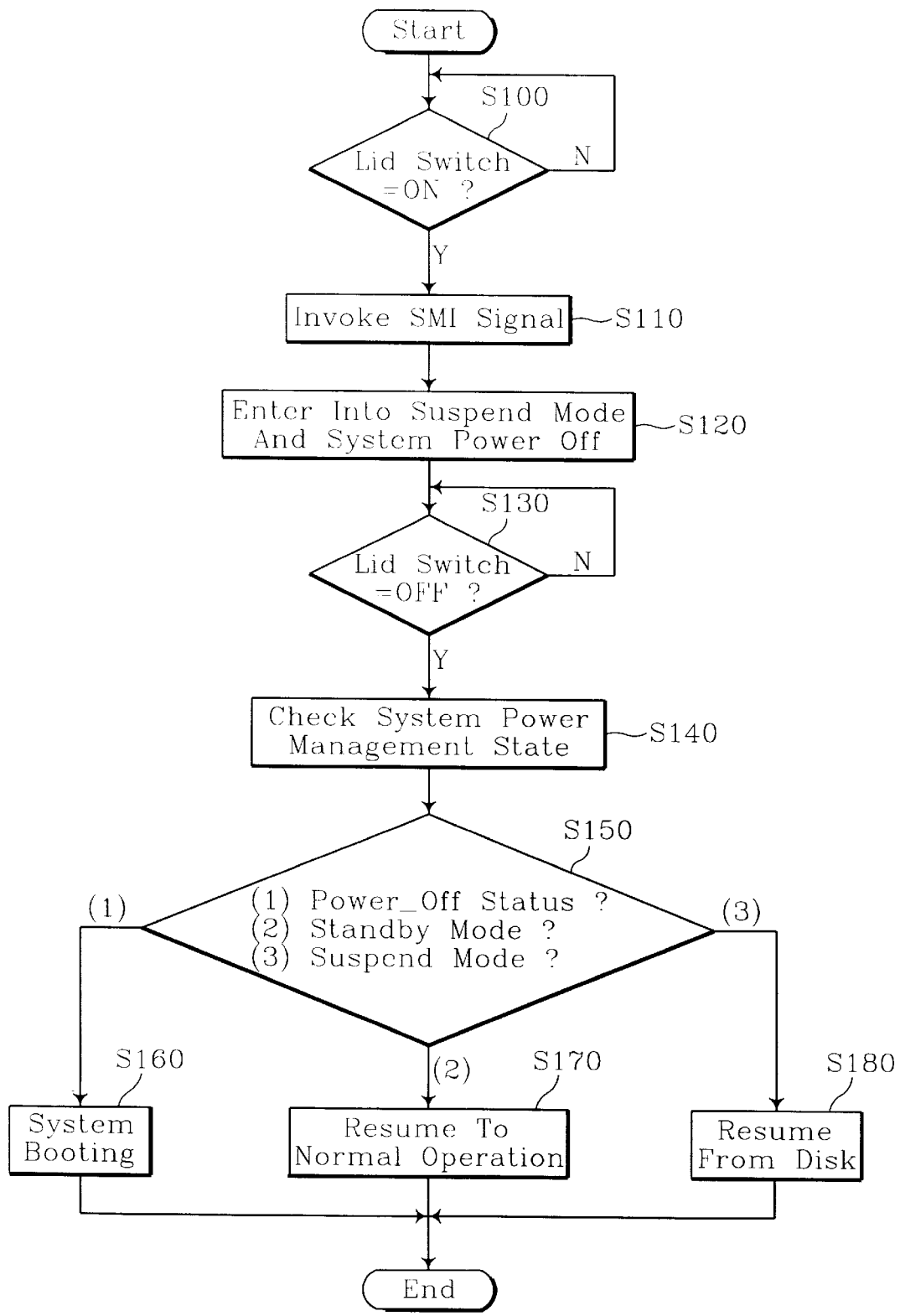

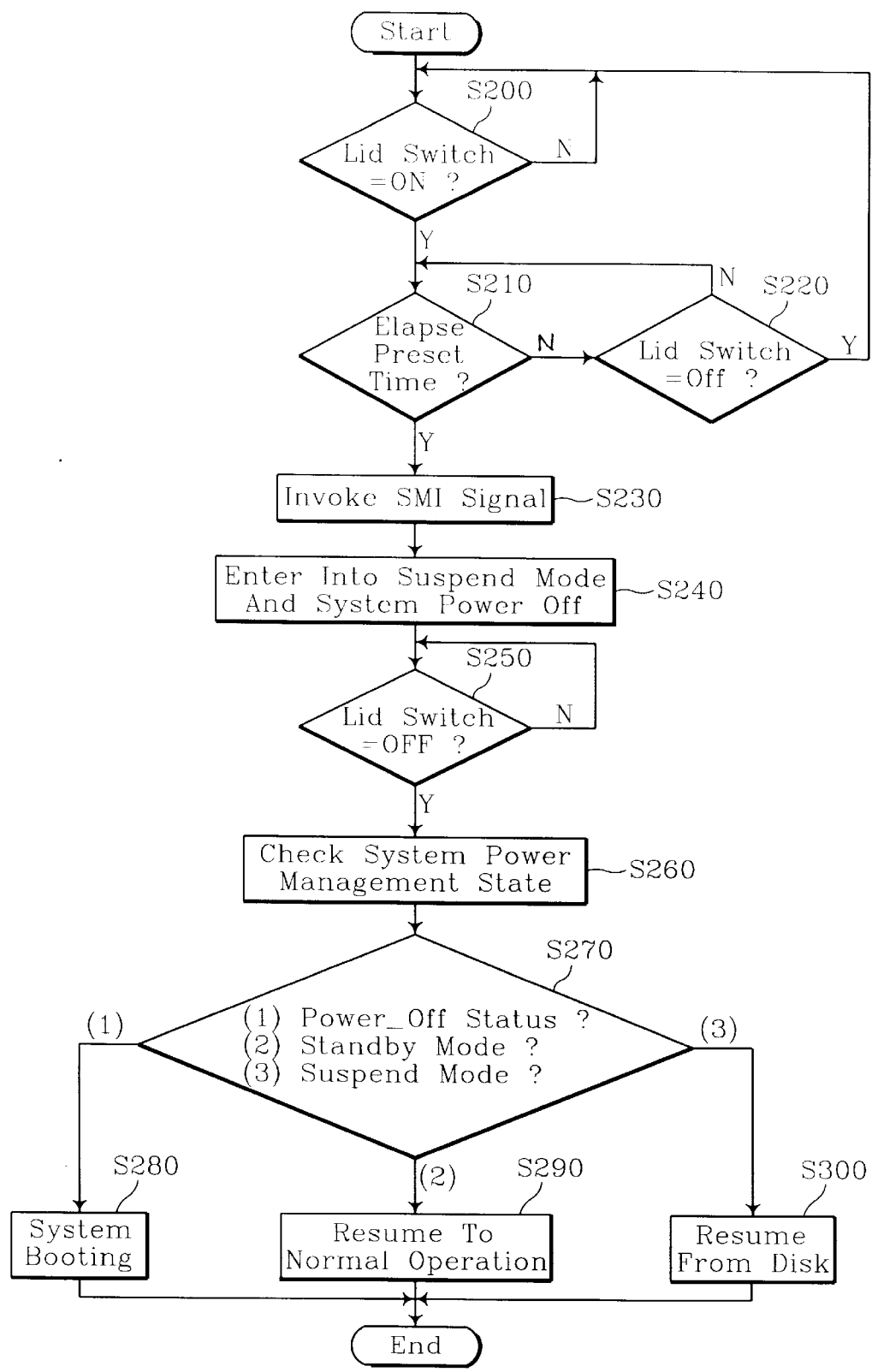

LID SWITCH IN PORTABLE COMPUTERS AND THE POWER MANAGEMENT SYSTEM USING THE SAME

CLAIM OF PRIORITY

This application makes reference to, incorporates the same herein, and claims all benefits accruing under 35 U.S.C. § 119 from an application entitled A LID SWITCH IN PORTABLE COMPUTERS AND THE POWER MANAGEMENT SYSTEM USING THE SAME earlier filed in the Korean Industrial Property Office on Apr. 15, 1997, and there duly assigned Serial No. 97-13727 by that Office.

BACKGROUND OF THE INVENTION

1. Technical Field

The present invention relates to a portable electronic device, and more particularly to a power management system having a switch able to respond to a closed state and an open state of a lid hingedly attached to the main body of a portable computer, in which power supplied to components of the portable computer is interrupted when the lid is closed.

2. Related Art

Compact and lightweight notebook and laptop computers have become increasingly popular due to their portability. In general, such a portable computer is composed of a main body having a keyboard and a lid, where the lid is hingedly attached to the main body of the portable computer. A flat panel display is typically mounted on the lid. Or in some instances it could be said that the flat panel display forms a lid covering the keyboard of the main body. Usually, the lid is closed when the portable computer is not in use. With the use of a latch device it is locked in the closed position to prevent the lid from being inadvertently opened. Thus, safe movement of the portable computer is possible.

Examples of latches for lids of portable computers are disclosed in U.S. Pat. No. 4,901,261 for Retractable Handle and Latch for Portable Computers issued to Fuhs and U.S. Pat. No. 5,580,107 for Hidden Latch Hook for Portable Personal Computer and the Like issued to Howell. An example of a complete housing for a portable computer is disclosed in U.S. Pat. No. 5,175,672 for Housing Apparatus for Portable Computer Systems issued to Conner et al.

Examples of methods and devices able to detect an open/closed state of a cover of a computer are disclosed in U.S. Pat. No. 5,235,532 for Information Processing Apparatus for Performing Operations in Response to the Opening and the Closing of a Cover Thereof issued to Sugino, U.S. Pat. No. 5,303,171 for System Suspend on Lid Close and System Resume on Lid Open issued to Belt et al., U.S. Pat. No. 5,077,551 for Display Panel Open/Closed Detection Mechanism, and Portable Electronic Apparatus Using the Same issued to Saitou, and U.S. Pat. No. 5,634,137 for Method and Apparatus for Updating System Configuration Based on Open/Closed State of Computer Housing Cover issued to Merkin et al.

In order to use the portable computer, the aforementioned latch is manually released and the flat panel display can be moved to the desired open position. When the portable computer is powered on and computer work is proceeding, the work may be interrupted by some matter or the computer may need to be moved. Then one may close the flat panel display before leaving the desk or moving the portable computer. Closing the lid with the power on may prevent heat dissipation through the top surface of the main body and this will affect system components due to excessive heat between the main body and the flat panel display.

In order to avoid this, the portable computer users may quit the program and turn off the power before closing the lid. Further, if the portable computer supports advanced power management (APM), the user may invoke the suspend mode by pressing special function keys. Suspend mode can be automatically invoked when the system is not used for a predetermined time interval. After the suspend mode is invoked, a central processing unit (CPU) clock is stopped and most power managed devices are not powered. When the system is first switched to the suspend mode, a basic input/output system (BIOS) program saves the current memory and system information to disk before the system goes to power-off status. When the system is turned on after being in the suspend mode, the system information is retrieved from the disk to resume normal operations. This power management is especially useful for portable computers to enable them to use less power while the system is running on battery power.

Examples of suspend systems for computers are disclosed in U.S. Pat. No. 5,021,983 for Suspend/Resume Apparatus and Method for Reducing Power Consumption in Battery Powered Computers issued to Nguyen et al. and U.S. Pat. No. 5,630,142 for Multifunction Power Switch and Feedback LED for Suspend Systems issued to Crump et al.

Note that turning off system power before closing the lid as well as pressing special function keys invoking the suspend mode is inconvenient and time-consuming since it requires manual operation and needs confirmation that the system has gone into power-off mode. In addition, when the computer work should be resumed, opening the lid and turning on the system power is also inconvenient.

Although presently there do exist power management systems for portable computers, I have discovered that it would be desirable to develop an enhanced power management system for portable computers.

SUMMARY OF THE INVENTION

It is therefore an object of the invention to provide a portable computer system supported by a power management system which responds to the closed state and open state of a flat panel display such that the power supplied to the system components is interrupted when the display is moved to the closed position.

It is another object of the present invention to provide a switch means which can detect a closed position and an open position of a flat panel display, without having a specific arrangement at the exterior of the portable computer.

In accordance with the present invention, there is provided a portable computer system which comprises a flat panel display hingedly attached to a main body of the portable computer, in which the display forms a lid covering a top side of the main body; a latch provided in the flat panel display for locking the flat panel display onto the main body when the display is moved from an open to a closed state, wherein the latch includes a knob having a latch hook and a groove formed in a top portion of the main body for locking and releasing the latch hook; a switch means provided adjacent the groove of the main body for detecting locking and releasing state of the latch hook; and a microcontroller responding to a switch-on and switch-off signal at the switch means to interrupt power supplied to the system components when the display is closed.

Preferably, the knob is pivotally mounted in a top middle portion of the display and receives a downward resilient force, and wherein the groove has a hole formed in one sidewall thereof so that the latch hook is inserted into the groove and latched around the hole when the flat panel display is closed. Also, the latch hook is released from the hole of the groove when the knob is lifted up manually and rotated upwardly.

Further, the switch means is mounted in a circuit board of the main body, and the switch means has an actuating bar projecting toward the hole of the groove, and wherein the actuating bar moves horizontally between switch-on and switch-off position in response to the locking and releasing state of the latch hook.

In accordance with another aspect of this invention, a new process is added to the power management operation of the portable computer of the above type, the process including the steps of checking if the switch-on signal is present at the switch means; invoking a system management interrupt (SMI) signal being supplied with the power management system if the switch-on signal is inputted to the microcontroller, forcing the computer system to enter into the suspend mode of the power management system; checking if the switch-off signal is present at the switch means during the suspend mode operation; determining whether the power management state is in the power-off mode or in the suspend mode; booting the computer system if the system has been in the power-off mode; and coming out of the suspend mode and performing resume from disk operation if the system has been in the suspend mode.

Preferably, the method further comprises the steps of determining whether a predetermined time has elapsed after the step of checking if the switch-on signal is present at the switch means, so that a proper margin for invoking a system management interrupt signal may be provided; and checking if the switch-off signal is occurring at the switch means until it reaches the preset time.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 5 illustrates a flow chart of a first power management method, according to the principles of the present invention, which is responsive to an opening and a closing of a flat panel display of a portable computer; and FIG. 6 illustrates a flow chart of a second power management method, according to the principles of the present invention.

DETAILED DESCRIPTION OF THE PREFERRED EMBODIMENT

Figure 1:
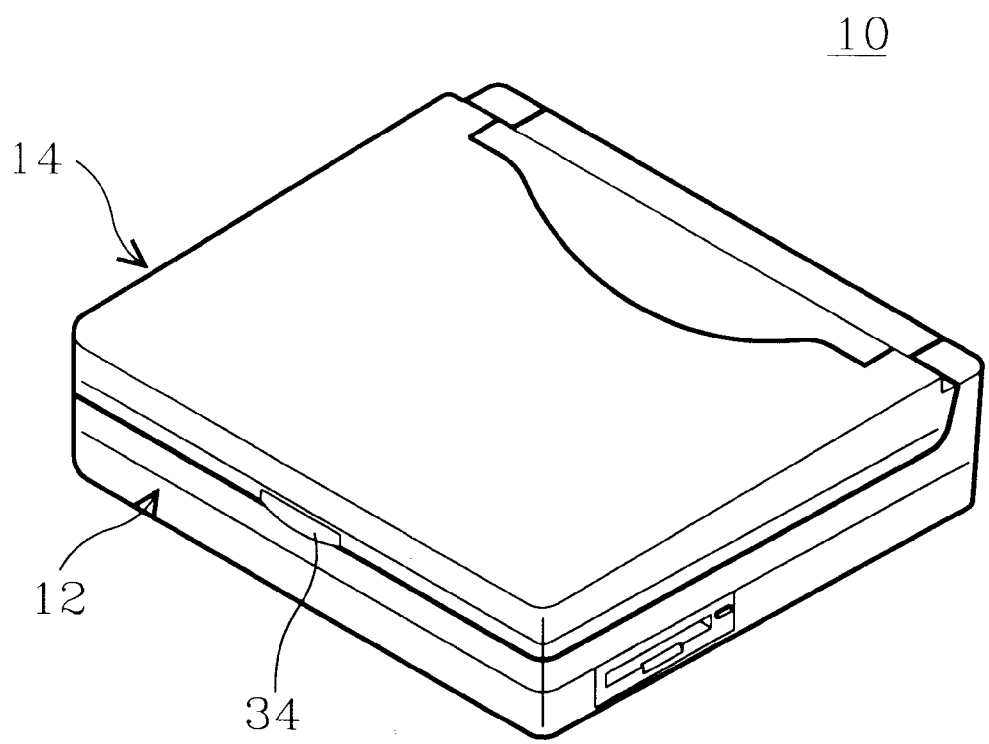
FIG. 1 illustrates a portable computer having a power management system, according to the principles of the present invention.
Figure 2:
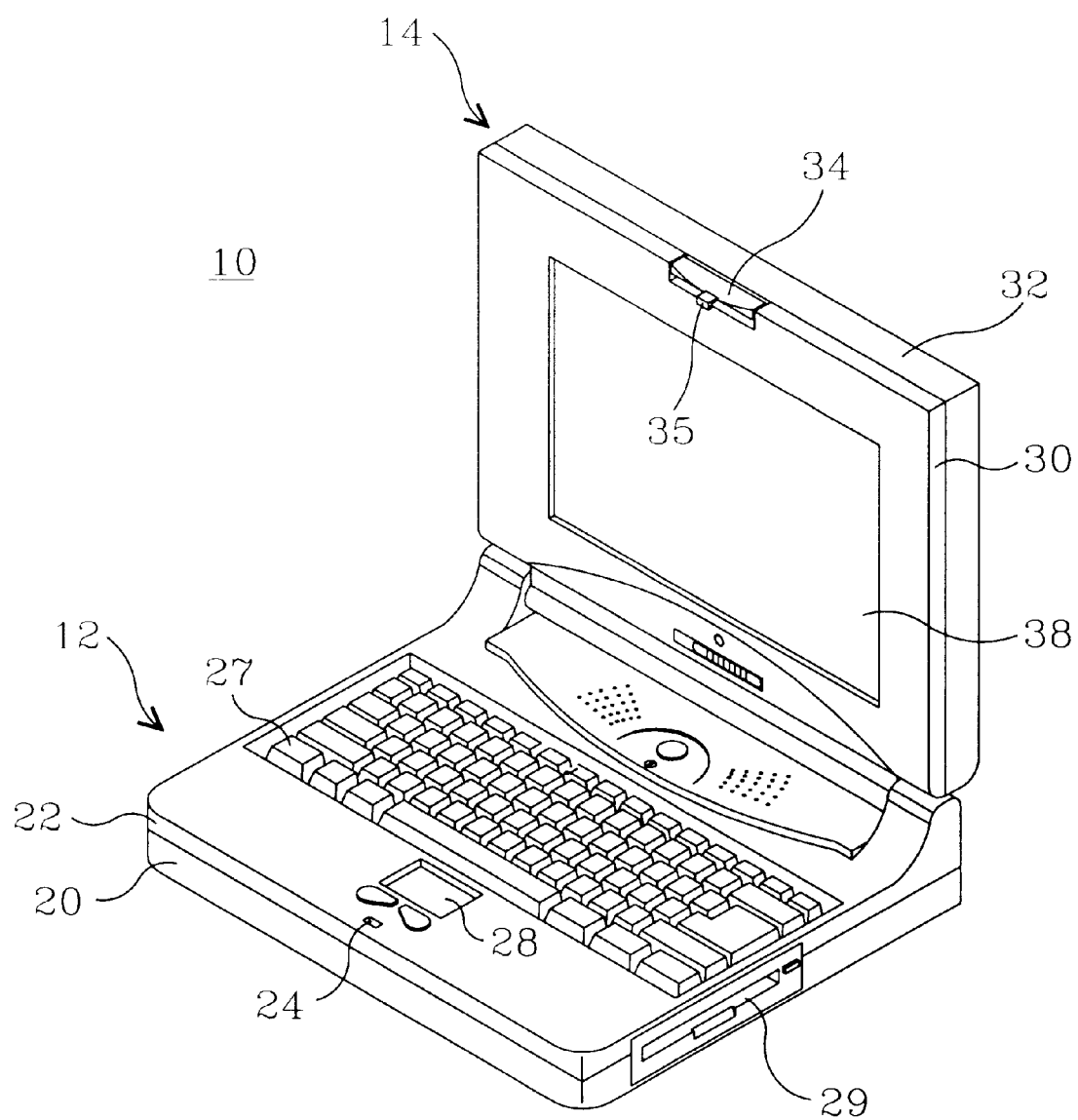
FIG. 2 illustrates the portable computer of FIG. 1, having a flat panel display of the computer moved to an open position.

Refer now to FIG. 1, which illustrates a portable computer having a power management system, according to the principles of the present invention. In addition, refer to FIG. 2, which illustrates the portable computer of FIG. 1, having a flat panel display of the computer moved to an open position. There is shown a portable computer 10 which includes a flat panel display 14 hingedly attached to the main body 12 of the portable computer 10. FIG. 1 shows a closed flat panel display 14, and FIG. 2 shows an opened flat panel display 14. The flat panel display 14 may include, for example, a liquid crystal display (LCD) 38. The flat panel display 14 also forms a lid covering the keyboard 27 provided at top side of the main body 12. Also provided at top side of the main body is a mouse pad 28. At one side of the computer 10, there is provided with a floppy disk drive 29 and at rear side thereof various connectors or ports (not shown). In the drawings, reference numerals 20 and 22 denote bottom cabinet and top cabinet of the main body 12, respectively. Also numerals 30 and 32 denote liquid crystal display front cover and liquid crystal display back cover, respectively. The portable computer 10 can correspond to a notebook computer, laptop computer, or other compact or lightweight computer. The present invention can be used in conjunction with a portable word processor also.

Further, the portable computer 10 includes a latch device for locking the flat panel display 14 onto the main body 12 when the display 14 is moved downwardly to the closed position of FIG. 1. This prevents the display 14 from being opened when the portable computer 10 is moved. The flat panel display 14 can be opened when the latch device is manually operated. Once the latch is released, the flat panel display 14 can be moved to a desired open position as shown in FIG. 2. The latch device includes a knob 34 with a latch hook 35 provided at front top center portion of the display 14 and a groove 24 formed in top cabinet 22 of the main body 12 for cooperating with the latch hook 35 of the knob 34.

Figure 3:
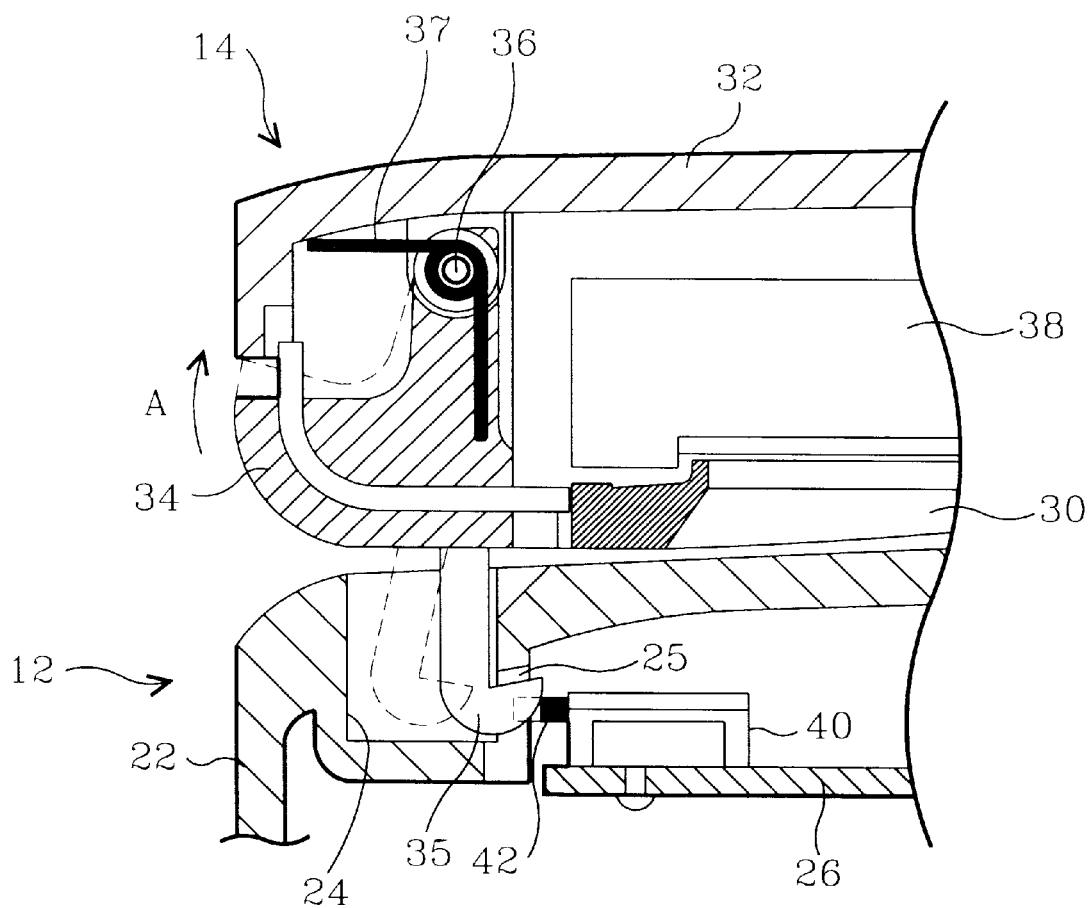
FIG. 3 illustrates a latch device of the portable computer of FIG. 1, showing a switch which responds to a movement of a latch hook within main body of the portable computer.

Refer now to FIG. 3, which illustrates a latch device of the portable computer of FIG. 1, showing a switch which responds to a movement of a latch hook within main body of the portable computer. The detail of the latch device shown in FIG. 3 represents a partial cross section of the latch knob 34 in the closed position of FIG. 1. Also shown is a switch 40 provided within the main body 12 of the portable computer 10 to respond to movement of the latch hook 35, according to the principles of the present invention. As the switch 40 of this invention is responsive to an opening and a closing of the flat panel display 14, it may be called a lid switch 40.

In FIG. 3, the knob 34 is pivotally mounted in the top middle portion of the back cover 32 of the display 14. An inward extension bar of the knob 34 is coupled with a support member formed at an inner wall of the back cover 32. A shaft 36 and a spring 37 are interposed between the extension bar and the support member in order to have the knob 34 receive a downward resilient force. Opposite to the inward extension bar, there is formed the latch hook 35 extended outwardly from the knob 34. The latch hook 35 is inserted into the groove 24 formed in the top cabinet 22 of the main body 12 and latched on a hole 25 formed in one sidewall of the groove 24, when the flat panel display 14 is closed. Also, the latch hook 35 can be released within the groove 24 when the knob 34 is lifted up manually and rotated in the direction A. The dashed line of the knob 34 with the hook 35 represents the released position.

Adjacent to the hole 25 of the groove 24, a switch 40 is provided in a circuit board 26 of the main body 12. The switch 40 has an actuating bar 42 projecting toward the hole 25 of the groove 24. The actuating bar 42 moves horizontally between a switch-on and a switch-off position of the switch 40. The actuating bar 42 is located such that in the closed position of the flat panel display 14, the end of the actuating bar 42 abuts against the distal end of the latch hook 35 and moves to the switch-on position. When the flat panel display 14 is in the open position, the end of the actuating bar 42 is released to return to the switch-off position.

With this arrangement, when the display 14 is moved to the closed position and the hook 35 of the knob 34 is inserted into the hole 25 along one sidewall of the groove 24, the distal end of the hook 35 is latched around the hole 25 of the groove 24 and at the same time pushes the end of the actuating bar 42 of the switch 40. Thus, the switch 40 can be moved from the switch-off state to the switch-on state. Also, when the knob 34 is lifted up manually and rotated in the direction of an arrow A to open the flat panel display 14, the latch hook 35 is released from the hole 25 of the groove 24, and thus latch hook 35 moves away from the end of the actuating bar 42 of the switch 40. This allows the switch 40 to return to the switch-off state. This embodiment has the lid switch 40 with the actuating bar 42, whereas the actuating bar 42 responds to the movement of the latch hook 35. However, a different embodiment could have a different switch other than lid switch 40 installed in the vicinity of the hole 25, such that the different switch turns on and off in response to the approach of the latch hook 35 without having the mechanical actuating bar 42. The switch-on state and switch-off state of the lid switch 40 is transmitted to components of the portable computer which performs a power management operation, according to the principles of the present invention.

Figure 4:
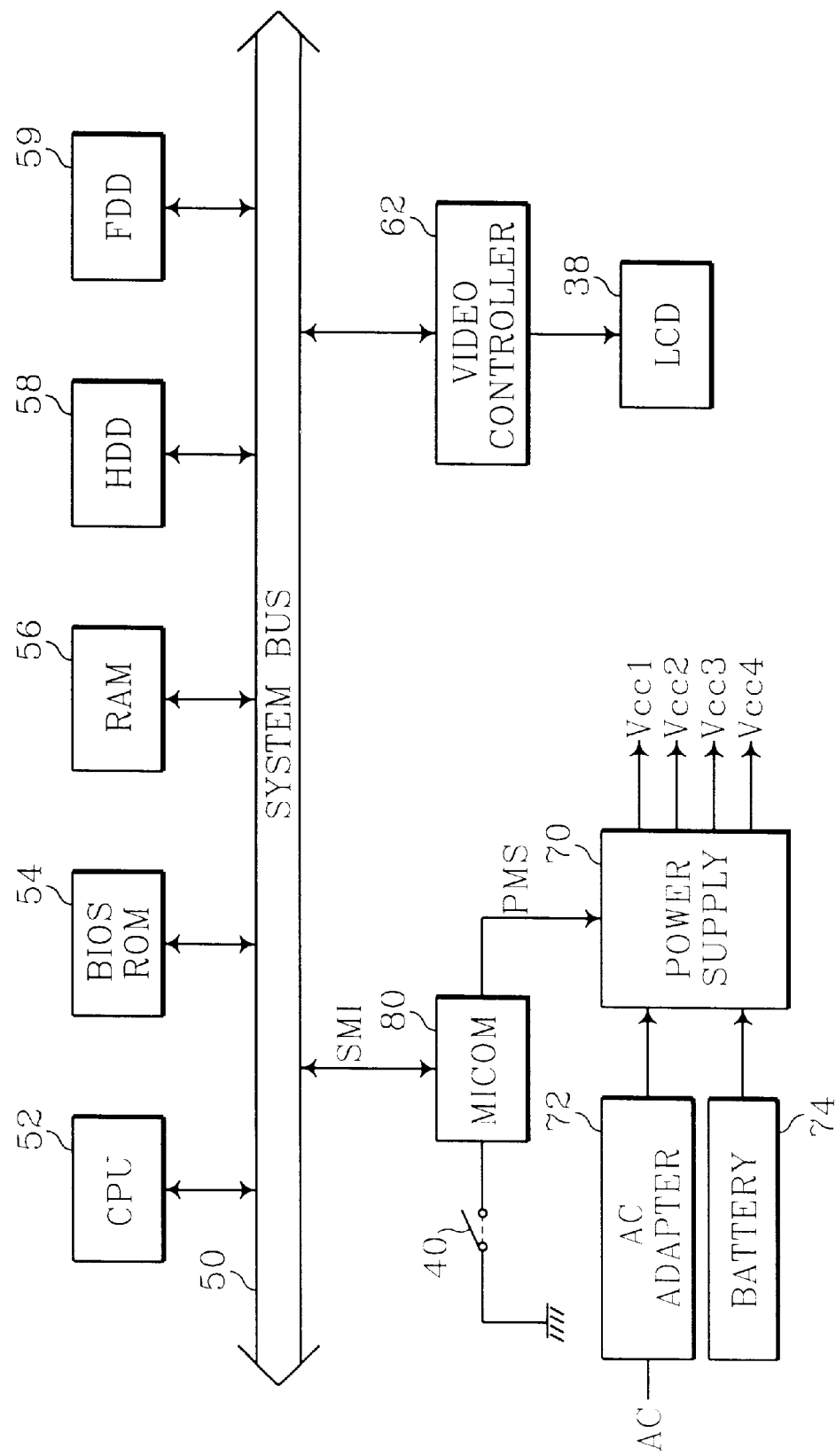
FIG. 4 illustrates a block diagram of a computer system implementing a power management system, according to the principles of the present invention.

Refer now to FIG. 4, which illustrates a block diagram of a computer system implementing a power management system, according to the principles of the present invention. The computer system includes a central processing unit (CPU) 52, a basic input/output system read only memory (BIOS ROM) 54, a random access memory (RAM) 56, a hard disk drive (HDD) 58, a floppy disk drive (FDD) 59, and a video controller 62 operably coupled to each other by system bus 50. The video controller 62 is coupled with a liquid crystal display (LCD) 38. The computer system further includes a power supply 70 which supplies required operating voltages Vcc1, Vcc2, Vcc3, and Vcc4 to the system components and a microcontroller (MICOM) 80 which controls power distribution of the power supply 70 according to the power management program stored in a basic input/output system read only memory (BIOS ROM) 54. The power source of the power supply 70 is selected from an alternating current (AC) adapter 72 and a battery 74. The alternating current adapter 72 receives power from an external source.

In this computer system, one input of the microcontroller 80 is connected with the output of the lid switch 40. The lid switch 40 is illustrated in FIGS. 3 and 4. The microcontroller 80 is also coupled with the system bus 50 and the power supply 70. The switch-on signal and switch-off signal of the switch 40 is supplied to the microcontroller 80. Responsive to the switch-on signal, a system management interrupt (SMI) signal is generated in the microcontroller 80 and is supplied to the computer system. The computer system invokes a power management signal (PMS) that permits the system to enter the suspend mode. The suspend mode is power consumption level which consumes the least amount of power. The suspend mode interrupts power supplied to the microprocessor, display apparatus, hard disk drives, floppy disk drives, and other subsystems. When a computer system is in suspend mode, the only power supplied to any components is the power supplied to the computer subsystem which can restore the computer system to a full power-on mode. The full power-on mode corresponds to the typical on mode of more conventional computer systems. Thus, power can be saved in the portable computer when the flat panel display 14 is closed.

Also, the computer system responds to the switch-off signal when the flat panel display 14 is opened. A system management interrupt (SMI) signal is generated in the microcontroller 80 and the computer system invokes a power management signal (PMS) that permits the system to come out of the suspend mode and to resume normal operations.

Refer now to FIG. 5, which illustrates a flow chart of a first power management method, according to the principles of the present invention, which is responsive to an opening and a closing of a flat panel display of a portable computer. At step S100, the microcontroller (MICOM) 80 determines whether the lid switch 40 has turned to a switch-on state. While the flat panel display 14 is in the closed position, the lid switch 40 is in the switch-on state. While the flat panel display 14 is in the open position, the lid switch 40 is in the switch-off state. Thus, when the lid switch 40 has recently turned to the switch-on state, this indicates that the flat panel display 14 has recently been closed.

At step S110, if the flat panel display 14 is placed into the closed position and the lid switch 40 is thereby turned to the switch-on state, the microcontroller 80 invokes a system management interrupt (SMI) signal. At step S120, the computer system forces the system components to enter into a suspend mode. At step S1 30, during the suspend mode, the microcontroller 80 checks if the lid switch 40 is turned to a switch-off state. At step S140, if it is determined that the lid switch 40 is turned to the switch-off state, corresponding to the opening of the flat panel display 14, the microcontroller 80 checks the power management state of the portable computer system.

At step S150 of FIG. 5, a query is made to determine whether the computer system is in a power-off mode, a stand-by mode, or the suspend mode. At step S160, if it is found that the computer system has been in the power-off mode, the computer system proceeds to a booting process. The power-off mode corresponds to the typical off mode of more conventional computer systems. At step S170, if it is found that the computer system has been in the stand-by mode, the computer system proceeds to come out of the stand-by mode and resume normal operation. The stand-by mode is characterized by devices, such as a video controller and a hard drive, being placed into a low-power mode transparent to the operating system and the applications executing on the computer system. At step S180, if it is found that the computer system has been in the suspend mode, the computer system proceeds to come out of the suspend mode and to resume operation from disk. The suspend mode is characterized by executing code being interrupted and the state of the computer system being saved to a file on the hard drive in such a manner that system power may be removed after the state of the computer system is saved to the hard drive. Later, after system power is restored, the state of the computer system is resumed by reading from the hard drive and loading it in such a manner that the operating system and application programs are not adversely affected.

Refer now to FIG. 6, which illustrates a flow chart of a second power management method, according to the principles of the present invention. The power management method illustrated in FIG. 6 is similar to that of FIG. 5, except for the interrogation step which occurs after a switch-on state is determined to be present. Thus, at step S200, the microcontroller (MICOM) 80 determines whether the lid switch 40 has turned to the switch-on state. At step S210, if the lid switch 40 has turned to the switch-on state, the computer system determines whether a preset time has elapsed. The preset time is a predetermined quantity of time. At step S230, if the preset time has elapsed, a system management interrupt (SMI) signal is invoked. The preset time is established so as to give a proper amount of time for invoking a system management interrupt signal in step S230. At step S220, prior to the elapsing of the preset time, the computer system checks to determine whether the lid switch 40 is returned to a switch-off state. The system returns to the initial step S200 if the lid switch 40 is returned to the switch-off state prior to the elapsing of the preset time.

With continued reference to FIG. 6, in this embodiment the preset time is a preferably set to a quantity of time of 10 seconds. The aforementioned preset time is one technique that can be used to prevent the system management interrupt signal from being invoked too early. The preset time acts as a delay. There do exist other methods accomplishing the same task, within the scope of the appended claims. The preset time prevents the system management interrupt signal from being invoked immediately, even though the flat panel display 14 is closed and the lid switch 40 is turned to the switch-on state. While the preset time is elapsing, a computer user has an opportunity to move the computer a short distance or leave it for a while with the display 14 in the closed position. And then, prior to the preset time elapsing, computer work can be resumed immediately merely by opening the flat panel display 14.

At step S230, if the preset time interval has elapsed, the microcontroller 80 invokes a system management interrupt signal. The step S240 of FIG. 6 corresponds to the step S120 of FIG. 5. Thus, at step S240, upon receiving a system management interrupt signal at step S230, the computer system invokes a power management signal that forces the system components to enter to the suspend mode. At step S250, during the suspend mode, the microcontroller 80 checks if the lid switch 40 is returned to the switch-off state. At step S260, if the lid switch 40 is found to have been returned to the switch-off state by the opening of the flat panel display 14, the microcontroller 80 checks the power management state of the portable computer system. At step S270, a query is made to determine whether the system is in a power-off mode, a stand-by mode, or the suspend mode. At step S280, if it is found that the computer system has been in the power-off mode, the computer system proceeds to a booting process. At step S290, if it is found that the computer system has been in the stand-by mode, the computer system proceeds to come out of the stand-by mode and to resume normal operation. At step S300, if it is found that the computer system has been in the suspend mode, the computer system proceeds to come out of the suspend mode and to resume operation from disk.

As apparent from foregoing, the power management system of this invention provides a simple and effective location of the switch for detecting a closed state and an open state of the flat panel display of a portable computer. This arrangement may eliminate special function keys which have been manually operated for turning off the computer or invoking a power management signal. Further, the present invention provides for a maximization of the battery life used in the portable computer, since the power saving can be started with the closing of the flat panel display. Computer components can be damaged by excessive heat. The computer components are protected from overheating if a suspend mode is invoked while the flat panel display is closed. Thus the present invention helps to lengthen the life of the computer components. Also, when the flat panel display is closed, components are protected from abrasions and other physical damage because the closed position helps to shield the keyboard, the touch pad, trackball, the liquid crystal display, and other components from abrasions. Since the flat panel display can be closed easily without any delay, a user is more likely to close the display rather than leave the display open. In particular, the present invention is advantageous in the case that the user leaves the portable computer for a while or is moving the portable computer a short distance without turning off the power.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A portable electronic apparatus, comprising:
   a base unit of the portable electronic apparatus, said base unit having a receptacle;
   a lid pivotally attached to said base unit, said lid being rotatable between an open position allowing access to said base unit and a closed position covering said base unit;
   a latch unit comprising a latch hook pivotally attached to said lid and protruding from said lid, said latch hook being rotatable between a first position locking said latch hook to said receptacle when said lid is moved to said closed position and a second position releasing said latch hook from said receptacle allowing said lid to be moved to said open position;
   a switch unit mounted in said base unit adjacent to said receptacle, detecting said latch hook when said lid is in said closed position and transmitting a first signal when detecting said latch hook; and
   a control unit receiving said first signal from said switch unit, and responding to said first signal by automatically interrupting power supplied to the portable electronic apparatus after a predetermined quantity of time elapses.

2. The apparatus of claim 1, wherein said control unit responds to said first signal by storing data of the portable electronic apparatus after said predetermined quantity of time elapses and before automatically interrupting power supplied to the portable electronic apparatus.

3. The apparatus of claim 1, wherein said latch unit further comprises a knob rigidly mounted to said latch hook such that said latch hook is released from said receptacle when said knob is rotated upwardly.

4. The apparatus of claim 1, said switch unit further comprising an actuating bar movable between a first bar position abutting said latch hook when said lid is in said closed position and a second bar position when said lid is in said open position.

5. The apparatus of claim 1, further comprising a printed circuit board within said base unit, said switch unit being mounted on said printed circuit board.

6. The apparatus of claim 1, wherein said lid includes a video display conveying visual information to a user, said video display being selected from the group consisting of a liquid crystal display, a cathode ray tube, a gas-plasma display, a light emitting diode display, an electroluminescent display, and a field emission display.

7. The apparatus of claim 1, wherein said portable electronic apparatus is selected from the group consisting of a portable computer and a portable word processor.

8. A portable electronic apparatus, comprising:
a base unit of the portable electronic apparatus, said base unit having a receptacle;
a keyboard connected with said base unit;
a memory storing data and visual information;
a lid pivotally attached to said base unit, said lid being rotatable between an open position allowing access to said keyboard and a closed position covering said keyboard;
a latch unit comprising a latch hook pivotally attached to said lid and protruding from said lid, said latch hook being rotatable between a first position locking said latch hook to said receptacle when said lid is moved to said closed position and a second position releasing said latch hook from said receptacle allowing said lid to be moved to said open position;
a switch unit mounted in said base unit adjacent to said receptacle, detecting said latch hook when said lid is in said closed position, not detecting said latch hook when said lid is in said open position, transmitting a first signal when detecting said latch hook, and transmitting a second signal when not detecting said latch hook; and
a control unit receiving said first and second signals from said switch unit, and responding to said first signal by first determining that a predetermined quantity of time has elapsed since receiving said first signal and then automatically starting a suspend routine and then interrupting power supplied to the portable electronic apparatus, said suspend routine comprising the step of storing said data and said visual information in said memory.

9. The apparatus of claim 8, wherein said control unit outputs a system management interrupt signal after determining that said predetermined quantity of time has elapsed since receiving said first signal, said system management interrupt signal being output before said interrupting of the power supplied to the portable electronic apparatus.

10. The apparatus of claim 8, wherein said latch unit further comprises a knob rigidly mounted to said latch hook such that said latch hook is released from said receptacle when said knob is rotated upwardly.

11. The apparatus of claim 8, said switch unit further comprising an actuating bar movable between a first bar position abutting said latch hook when said lid is in said closed position and a second bar position when said lid is in said open position.

12. The apparatus of claim 8, further comprising a printed circuit board within said base unit, said switch unit being mounted on said printed circuit board.

13. The apparatus of claim 8, wherein said lid includes a video display conveying said visual information to a user, said video display being selected from the group consisting of a liquid crystal display, a cathode ray tube, a gas-plasma display, a light emitting diode display, an electroluminescent display, and a field emission display.

14. The apparatus of claim 8, wherein said portable electronic apparatus is selected from the group consisting of a portable computer and a portable word processor.

15. A method for controlling a power management system provided in a portable computer, comprising the sequential steps of:
checking whether a first signal is received from a switch unit, said first signal being transmitted from said switch unit when a latch unit pivotally attached to a lid of the portable computer is in a first position locking said latch unit to a receptacle in a main body of the portable computer, said latch unit being in said first position when said lid is moved from an open lid position where said lid allows access to said main body to a closed lid position where said lid covers said main body, said lid being hingedly attached to said main body;
when said first signal is received from said switch unit, transmitting a system interrupt signal starting a suspend routine, and then interrupting power supplied to the portable computer, said suspend routine comprising the step of writing data to a memory;
sensing whether a second signal is received from said switch unit, said second signal being transmitted from said switch unit when said latch unit is in a second position releasing said latch unit from said receptacle, said second position of said latch unit allowing said lid to be moved to said open lid position;
when said second signal is received from said switch unit, sensing whether the portable computer is in a power-off state where said step of writing data to said memory has not occurred, and sensing whether the portable computer is in a suspend state where said step of writing data to said memory has occurred;
when the portable computer is in said power-off state, booting the portable computer by restoring circuits in the portable computer to a default condition and providing power to the portable computer; and
when the portable computer is in said suspend state, reading said data from said memory and providing power to the portable computer.

16. The method of claim 15, wherein said lid includes a video display conveying visual information to a user, said video display being selected from the group consisting of a liquid crystal display, a cathode ray tube, a gas-plasma display, a light emitting diode display, an electroluminescent display, and a field emission display.

17. The method of claim 15, further comprising the step of confirming that a predetermined quantity of time has elapsed, said confirming step occurring after said first signal is received from said switch unit and before said step of transmitting said system interrupt signal.

18. The method of claim 17, further comprising the step of returning to said checking step when said second signal is received from said switch unit after said first signal is received from said switch unit and before said confirming step has occurred.

19. The method of claim 15, wherein said latch unit comprises a latch hook and a knob, said knob rigidly mounted to said latch hook such that said latch hook is released from said receptacle when said knob is rotated upwardly.

20. The method of claim 19, wherein said switch unit is mounted to said main body adjacent to said receptacle, detecting said latch hook when said lid is in said closed lid position, transmitting said first signal when detecting said latch hook, not detecting said latch hook when said lid is in said open lid position, and transmitting said second signal when not detecting said latch hook.

* * * * *